Nov. 25, 1941.    C. R. BROWN    2,263,608
TREATMENT OF DISTILLERY SLOP
Filed July 22, 1937
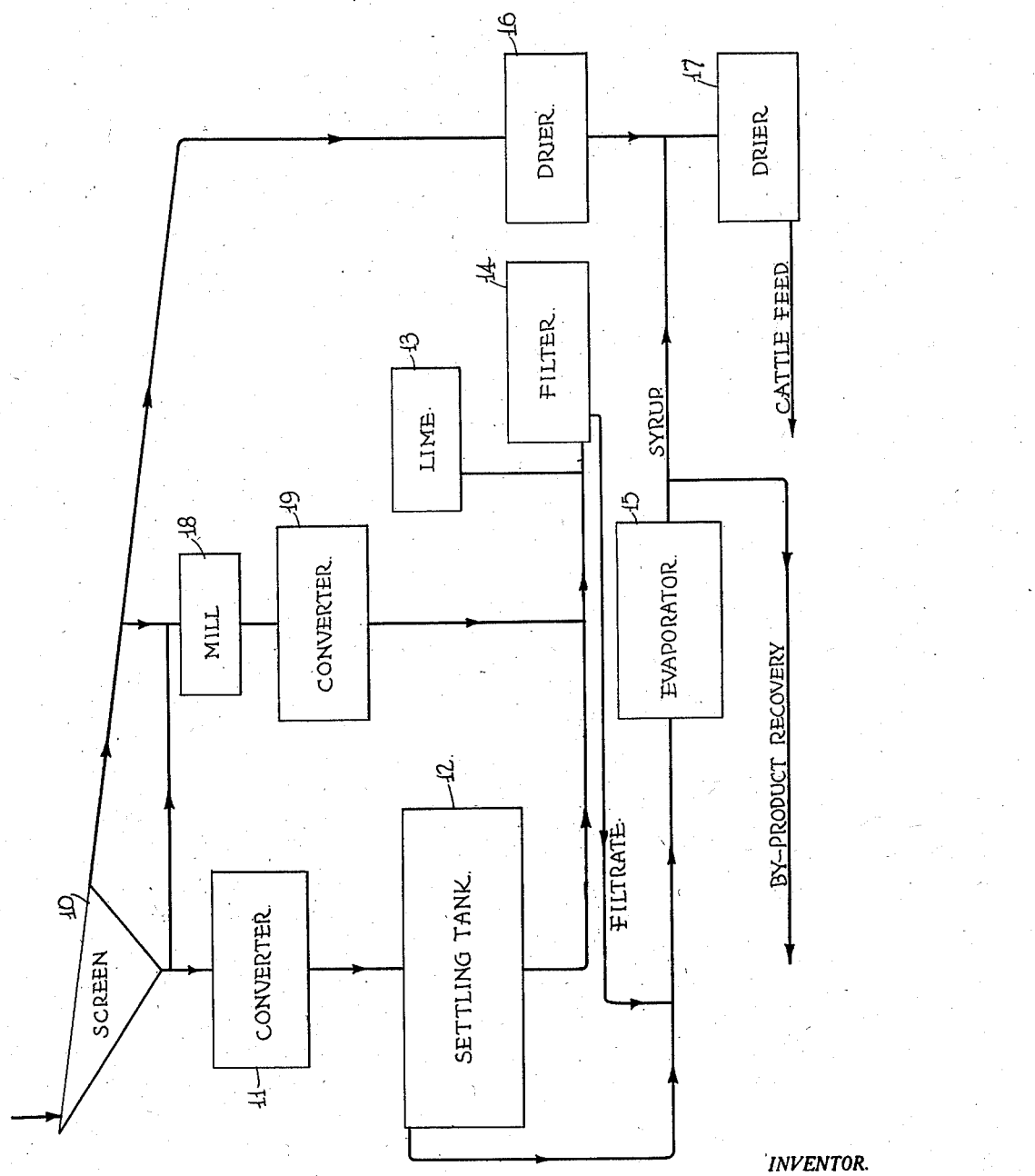
INVENTOR.
CHARLES R. BROWN
BY Maurice A. Crews
ATTORNEY Patented Nov. 25, 1941

2,263,608

UNITED STATES PATENT OFFICE 2,263,608

TREATMENT OF DISTILLERY SLOP

Charles R. Brown, Champaign, Ill., assignor to The Sharples Corporation, Philadelphia, Pa., a corporation of Delaware Application July 22, 1937, Serial No. 155,036

7 Claims. (Cl. 99—5)

The present invention pertains to the treatment of distillery slop. The object of the invention has been to improve the procedure described and claimed in my prior application, Serial No. 76,087, filed April 23, 1936, for Treatment of distillery slop. In my prior application, a procedure is described in which distillery slop is subjected to the application of high temperature at pressures substantially in excess of atmospheric pressure, such pressures (e. g., equilibrium pressure) being applied in order to keep the slop liquid at the temperature employed.

In that process, the slop obtained as a residue from distillation following fermentation to produce ethyl or other alcohols is subjected to a temperature substantially in excess of its atmospheric boiling point for a period of time sufficient to convert the slop into a form in which it may be filtered through cloth with facility. Such heating apparently effects a conversion of the gummy and albuminous impurities of the slop into a form in which these impurities do not cause cloggage of the filter cloth such as would occur if an attempt were made to filter the slop in the absence of such preliminary conversion. In the performance of that process, the slop is subjected to a temperature substantially in excess of its boiling point at a super-atmospheric pressure considerably in excess of 15 pounds per square inch, the pressure being maintained sufficiently high to keep the slop in liquid phase. The temperature necessary to effect efficient conversion will ordinarily be substantially in excess of 273° F. and the operation of heating to effect conversion will ordinarily be continued for a period of at least 20 minutes and usually one-half hour or longer, depending upon the particular character of the slop, i. e., upon the grain from which the slop is produced and the character of the fermentation and distillation operations.

Objects of the present invention have been to improve the process of the prior application in such a manner as to facilitate the operation of filtration by increasing the filtration rate and making it possible to continue the operation of filtration at reasonably high capacity for a longer period of time than was possible in connection with the prior process.

In accordance with the present invention, the slop or a portion thereof is converted in the same general manner as described in the prior application. The subsequent operation of filtration of the converted slop is improved by the addition to the converted slop of an alkaline reagent which reacts with portions of the slop to form an insoluble precipitate. This insoluble precipitate assists in the filtration operation by improving the rate of filtration and rendering continued filtration feasible at much higher capacities than can be attained by the process of the prior application.

In the practice of the present invention, as in the practice of the invention of the prior application, the filtrate resulting from the filtering operation which follows the step of pressure conversion is concentrated by evaporation to a point at which its moisture content is very low (e. g., 30%). This step of concentration is preferably performed in a multiple effect evaporator. As described in my prior application, a feature of that application consists in the fact that the performance of the steps of pressure conversion and filtration affords a clear filtrate which can be evaporated to a much higher degree than could liquids heretofore obtained from distillery slop. In cases in which the converted slop is subjected to a liming operation as described above prior to filtration, the alkaline filtrate can not be directly concentrated to the desired extent. It is necessary that the filtrate be acidified, otherwise it becomes so viscous that it will not flow through the evaporator. In the practice of the present invention, this difficulty is obviated by mixing the filtrate with acid liquid derived from the distillery slop itself.

Further objects and advantages of the invention and the manner in which they have been attained will be evident from a reading of the subjoined specification in the light of the attached flow sheet in which the single figure represents the steps of the process of the invention and the apparatus for practicing them.

Referring to the drawing by reference characters, distillery slop, which may be obtained as a residue from the fermentation and distillation of grain is passed from the still to a coarse screen 10 (e. g., a 60 mesh screen). This screen effects removal of the coarser solids of the slop and the finer solids and liquid are passed from the screen to a converter 11. This converter may be an ordinary autoclave or it may be in the form of a continuous apparatus through which the slop may be passed while it is heated under pressure to a temperature in excess of 258° F. for a period of time sufficient to convert the slop into a state in which it can be filtered through cloth with facility. In the conversion of slop obtained as the result of the manufacture of alcohol from rye, for example, the converting operation may ordinarily be accomplished by heating slop to a temperature of 287° F. for a period of ten minutes. The converted slop is then passed to a settling tank 12 from which a clear liquid is decanted. The sludge which settles at the bottom of the tank 12 is passed from that tank and mixed with an alkaline reagent capable of reacting with the sludge to form an insoluble precipitate. The formation of this insoluble precipitate assists in the subsequent operation of filtration by improving the rate and efficiency of the filtration. The reagent, which may be added to the slop from a container 13, may be calcium hydroxide, barium hydroxide, or hydroxides and carbonates of these or other alkaline earth metals and the step of adding such reagent will be hereinafter referred to as liming.

The limed slop is next subjected to a filtering operation in a filter 14. As indicated above, the limed filtrate, when evaporated to a high degree of concentration would become so viscous that it could not be passed continuously through a continuous evaporator. Since it is desirable to concentrate the filtrate to a high degree, the filtrate is acidified in the practice of the invention and this acidification is preferably accomplished by employing, as a source of acid, liquid derived from the slop itself. In the embodiment illustrated in the drawing, the clear liquid decanted from the top of the settling tank 12 is added to the limed filtrate and the mixture of these two liquids is concentrated by evaporation in a multiple effect evaporator 15. The concentrated syrup passing from the evaporator 15 may be combined with solids screened from the slop on the screen 10 and dried in a conventional dryer 16. The mixture of syrup and partially dried solids may then be further dried in a conventional dryer 17 and used as cattle feed.

A part or all of the syrup from the evaporator 15 may be subjected to special treatment for by-product recovery as indicated on the flow sheet.

The operation of filtration in the filter 14 may be further facilitated by addition to the slop sludge passing from the settling tank 12 of a fibrous filter aid material as well as the liming agent which is added to that sludge. Thus, a part of the solids passing from the screen 10 may be subjected to a separate converting operation of similar character to that performed in the converter 11, this converting operation being performed in converter 19 (preferably after the solids have been broken up in a mill 18 of the hammer, roll or ball type). The slop solids converted in converter 19 may then be added to the slop sludge passing from settling tank 12 and the solids added from converter 19 operate as a fibrous filter aid to assist in the filtration operation in the filter 14. A small amount of liquid may be drawn from the screened liquid passing through the screen 10 to render the mixture converted in converter 19 fluid.

Still further modifications will be obvious to those skilled in the art and I do not therefore wish to be limited except by the scope of the subjoined claims.

I claim:

1. The process of treating distillery slop resulting from fermentation to produce alcohol which comprises heating said slop to a temperature in excess of its atmospheric boiling point at a pressure sufficiently high to maintain the slop in liquid phase and for a period of time sufficient to convert said slop to a state in which its continuous filtration through cloth is feasible, liming said converted slop, thereafter filtering said slop through cloth, acidifying the filtrate from said filtering operation and concentrating the acidified filtrate by evaporation.

2. The process of treating distillery slop resulting from fermentation to produce alcohol which comprises heating said slop to a temperature in excess of its atmospheric boiling point at a pressure sufficiently high to maintain said slop in liquid phase and for a period of time sufficient to convert said slop to a state in which its continuous filtration through cloth is feasible, separating clear liquid from said converted slop by subsidence, liming the slop sludge resulting from said subsidence separating operation, thereafter filtering the limed slop sludge through cloth, adding clear liquid from said subsidence separating operation to the limed filtrate from said filtering operation and concentrating the mixture of filtrate and slop liquid from the subsidence separating operation by evaporation.

3. The process of treating distillery slop resulting from fermentation to produce alcohol which comprises heating said slop to a temperature in excess of its atmospheric boiling point at a pressure sufficiently high to maintain the slop in liquid phase and for a period of time sufficient to convert said slop to a state in which its continuous filtration through cloth is feasible, liming said converted slop, thereafter filtering said slop through cloth, acidifying the filtrate from said filtering operation by adding to said filtrate liquid derived from distillery slop and concentrating the acidified filtrate by evaporation.

4. The process of treating distillery slop resulting from fermentation to produce alcohol which comprises heating said slop to a temperature in excess of its atmospheric boiling point at a pressure sufficiently high to maintain the slop in liquid phase and for a period of time sufficient to convert said slop to a state in which its continuous filtration through cloth is feasible, liming said converted slop, thereafter filtering said slop through cloth, acidifying the filtrate from said filtering operation by adding to said filtrate clear liquid derived from distillery slop and concentrating the acidified filtrate by evaporation.

5. The method of treating thick distillery slop comprising: separating the large solids and thin slop constituents of the thick slop; reducing the size of the large solids; precipitating protein material from the thin slop under superatmospheric pressure and at a temperature higher than the temperature of the thick slop; mixing the reduced solids with the thin slop and precipitate in order to provide a filter aid therefor; and filtering the mixture.

6. The method of treating thick distillery slop comprising: separating the large solids and thin slop constituents of the thick slop; reducing the size of the large solids; precipitating protein material from the thin slop under superatmospheric pressure and at a temperature substantially above 212° F.; mixing the reduced solids with the thin slop and precipitate in order to provide a filter aid therefor; and filtering the mixture.

7. The method of increasing the yield of by-product grain from thick distillery slop comprising: separating large solids and thin slop constituents of the thick slop; forming a filter aid by subdividing the large solids; precipitating protein material from the thin slop under superatmospheric pressure and at a temperature above the atmospheric boiling point of the liquid ingredients; mixing the filter aid with the thin slop and precipitate; and filtering the solids and precipitate from the mixed materials to form a cake of by-product grain material.

CHARLES R. BROWN.